(12) United States Patent
Sirpal et al.

(10) Patent No.: US 10,222,947 B2
(45) Date of Patent: Mar. 5, 2019

(54) METHODS AND DEVICES FOR PRESENTING DYNAMIC INFORMATION GRAPHICS

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao, P.R.C. (CN)

(72) Inventors: Sanjiv Sirpal, Oakville (CA); Alexander De Paz, Burlington (CA)

(73) Assignees: JAMDEO CANADA, LTD., Ontario (CA); HISENSE USA CORP., Suwanee, GA (US); QINGDAO HISENSE ELECTRONICS CO., LTD., Qingdao (CN)

(*) Notice: Subject to any disclaimer, the term of this patent is extended or adjusted under 35 U.S.C. 154(b) by 315 days.

(21) Appl. No.: 15/190,144

(22) Filed: Jun. 22, 2016

(65) Prior Publication Data

US 2016/0379395 A1    Dec. 29, 2016

Related U.S. Application Data

(60) Provisional application No. 62/184,476, filed on Jun. 25, 2015, provisional application No. 62/183,613, filed on Jun. 23, 2015.

(51) Int. Cl.
*G06F 3/048*    (2013.01)
*G06F 17/30*    (2006.01)
(Continued)

(52) U.S. Cl.
CPC ............ *G06F 3/0482* (2013.01); *G06F 3/017* (2013.01); *G06F 3/0481* (2013.01);
(Continued)

(58) Field of Classification Search
CPC ........................ G06F 17/30619; G06F 3/0481
See application file for complete search history.

(56) References Cited

U.S. PATENT DOCUMENTS 5,886,698 A * 3/1999 Sciammarella ....... G06F 3/0486
                                                      707/999.005
7,961,860 B1 * 6/2011 McFarlen ............... H04M 3/38
                                                      379/188

(Continued)

*Primary Examiner* — Scott T Baderman
*Assistant Examiner* — Mario M Velez-Lopez
(74) *Attorney, Agent, or Firm* — Gordon & Rees LLP (57) ABSTRACT

The present disclosure relates to systems, methods, electronic devices and applications for presenting a user interface including a dynamic information graphic. In one embodiment, a method includes detecting an operational mode of the device for conducting a communication session by device, and presenting a user interface for the communication session including a dynamic information graphic, wherein the dynamic information graphic includes one more graphical elements based on the operational mode. The method may also include detecting one or more parameters for the communication session and updating presentation of the user interface and display of the dynamic information graphic based on the one or more parameters, wherein presentation and configuration of the dynamic information graphic provides a visual representation based on device actions during the operational mode. Another embodiment is directed to a device configured to present a dynamic information graphic.

20 Claims, 5 Drawing Sheets

(51) Int. Cl.
    *G06F 3/0482*     (2013.01)
    *G06F 3/0488*     (2013.01)
    *G06F 3/0484*     (2013.01)
    *G06F 3/0485*     (2013.01)
    *G06F 3/0481*     (2013.01)
    *G06F 3/16*     (2006.01)
    *G06T 11/60*     (2006.01)
    *H04L 12/58*     (2006.01)
    *H04L 29/08*     (2006.01)
    *G06F 3/01*     (2006.01)
    *H04B 1/3827*     (2015.01)
    *H04N 5/232*     (2006.01)
    *H04N 5/77*     (2006.01)

(52) U.S. Cl.
    CPC ......... *G06F 3/0484* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/167* (2013.01); *G06F 17/30619* (2013.01); *G06F 17/30705* (2013.01); *G06T 11/60* (2013.01); *H04B 1/3833* (2013.01); *H04L 51/04* (2013.01); *H04L 67/142* (2013.01); *H04N 5/23216* (2013.01); *H04N 5/23245* (2013.01); *H04N 5/77* (2013.01); *G06T 2200/24* (2013.01)

(56) References Cited

U.S. PATENT DOCUMENTS

| | | | | |
|---|---|---|---|---|
| 2004/0203674 | A1* | 10/2004 | Shi | H04M 1/72519 455/415 |
| 2008/0037751 | A1* | 2/2008 | Aldrey | H04M 3/42161 379/202.01 |
| 2010/0262928 | A1* | 10/2010 | Abbott | G06F 3/04817 715/769 |
| 2011/0092255 | A1* | 4/2011 | Igor | G06F 8/34 455/566 |
| 2011/0112833 | A1* | 5/2011 | Frankel | G10L 15/32 704/235 |
| 2012/0173229 | A1* | 7/2012 | Peterson | H04M 3/5175 704/200 |
| 2012/0311434 | A1* | 12/2012 | Skrenta | G06F 17/30873 715/234 |
| 2012/0323575 | A1* | 12/2012 | Gibbon | H04L 67/306 704/246 |
| 2015/0381440 | A1* | 12/2015 | Zhao | H04L 65/4038 709/204 |

* cited by examiner

METHODS AND DEVICES FOR PRESENTING DYNAMIC INFORMATION GRAPHICS

CROSS-REFERENCE TO RELATED APPLICATIONS

This application claims priority to U.S. Provisional Application No. 62/183,613 titled SYSTEM AND METHODS FOR A USER INTERFACE AND DEVICE OPERATION filed on Jun. 23, 2015, and U.S. Provisional Application No. 62/184,476 titled SYSTEM AND METHODS FOR A USER INTERFACE AND DEVICE OPERATION filed on Jun. 25, 2015, the content of which is expressly incorporated by reference in its entirety.

FIELD

The present disclosure relates to electronic devices and presentation of graphical elements on a display device, and more particularly to methods and devices configured for presentation of dynamic information graphics.

BACKGROUND

Mobile devices and personal communication devices are generally used for multiple purposes. With development of applications and device capabilities, there exists a need for device configurations that improve performance and resolve drawbacks of the conventional configurations. One area where improvements are needed is for device control configurations.

Regarding conventional methods, devices often do not employ the full display area of a device to provide information. Similarly, use of display area for certain functions of the device is typically not informative. There exists a need to overcome the conventional configuration that provides useful information and allows for user interfaces to handle the increasing functions and applications available to a device.

BRIEF SUMMARY OF THE EMBODIMENTS

Disclosed and claimed herein are systems, methods and devices for presenting a user interface including a dynamic information graphic. One embodiment is directed to a method including detecting, by a device, an operational mode of the device for conducting a communication session by device, and presenting, by the device, a user interface for the communication session including a dynamic information graphic, wherein the dynamic information graphic includes one more graphical elements based on the operational mode. The method also includes detecting, by the device, one or more parameters for the communication session, and updating, by the device, presentation of the user interface and display of the dynamic information graphic based on the one or more parameters, wherein presentation and configuration of the dynamic information graphic provides a visual representation based on device actions during the operational mode.

In one embodiment, the operational mode is associated with one of dialing, on call status, hold, transfer and termination of voice communication operations of the device.

In one embodiment, the dynamic information graphic is presented as a movable graphic, wherein one or more of size, color and motion are based on the one or more parameters.

In one embodiment, the dynamic information graphic is presented as a scrollable timeline of the communication session.

In one embodiment, detecting one or more parameters includes detecting voice input of the voice communication and determining one or more terms from the voice communication.

In one embodiment, updating presentation of the user interface and display of the dynamic information graphic includes displaying the one or more terms by the device as part of the dynamic information graphic.

In one embodiment, detecting one or more parameters includes detecting a stage of the communication session.

In one embodiment, updating the dynamic information graphic includes modifying the presentation of the dynamic information graphic based on the stage of the communication session.

In one embodiment, the method includes generating a visual representation of the voice communication based on presentation of the dynamic information graphic and parameters detected.

In one embodiment, the method includes matching voice detected in the voice communication to one or more predefined terms, and wherein updating includes presenting matched terms as text on the display.

Another embodiment is directed to a device including memory and a controller coupled to the memory. The controller is configured to detect an operational mode of the device for conducting a communication session by device, and present a user interface for the communication session including a dynamic information graphic, wherein the dynamic information graphic includes one more graphical elements based on the operational mode. The controller is also configured to detect one or more parameters for the communication session, and update presentation of the user interface and display of the dynamic information graphic based on the one or more parameters, wherein presentation and configuration of the dynamic information graphic provides a visual representation based on device actions during the operational mode.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to presenting a dynamic information graphic on a display of a device to provide an indication of the operational mode of a device. In one embodiment, a method for presenting a user interface including a dynamic information graphic includes detecting an operational mode of the device for conducting a communication session and presenting a user interface for the communication session including a dynamic information graphic. The dynamic information graphic includes one more graphical elements based on the operational mode, and may be updated by the device to provides a visual representation based on device actions during the operational mode.

As used herein, a dynamic information graphic relates to one or more graphical elements presented on a display of a device to visually and/or graphically display a function of the device. Dynamic information graphics may include text and graphical treatments, such as animations or other display renderings.

Another aspect is directed to generating a dynamic information graphic for a communication session. In one embodiment, presentation of a dynamic information graphic includes detection and monitoring of a communication session to modify and/or generate elements of the dynamic information graphic. By way of example, the dynamic information graphic may be presented with graphical elements as including visual elements (e.g., geometry wave patterns, etc.), wherein the visual elements are modified during display to include text describing a function or action of the device. In an embodiment directed to voice communication, the dynamic information graphic may include sinusoidal wave patterns that are labeled at one or more points with terms detected from the voice communication and one or more graphical elements to identify the stage of the communication session. According to another embodiment, the dynamic information graphic may be stored by the device for later viewing and/or review.

A system, methods and device configurations are provided for presenting dynamic information graphics. In contrast to background imagery and/or communication session timers, a dynamic information graphic allows for information that can be enriched according to data detected by the device and/or generating a timeline of device operation.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1A:
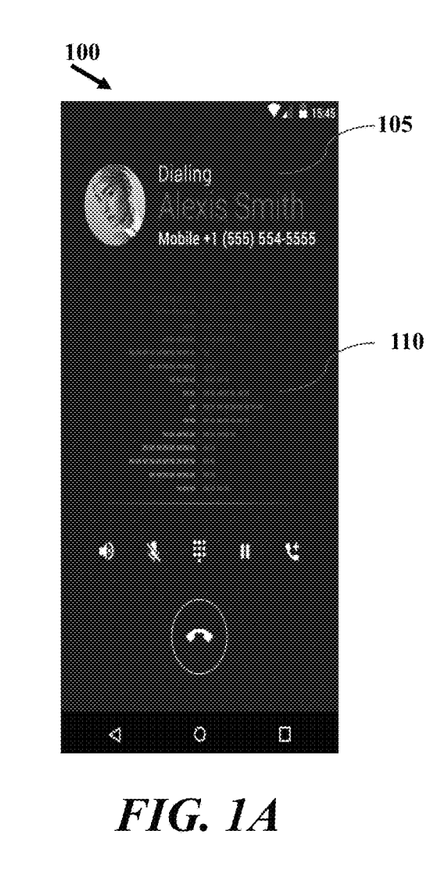
FIGS. 1A-1C depict graphical representations of user interface presentation including dynamic information graphics according to one or more embodiments.
Figure 1B:
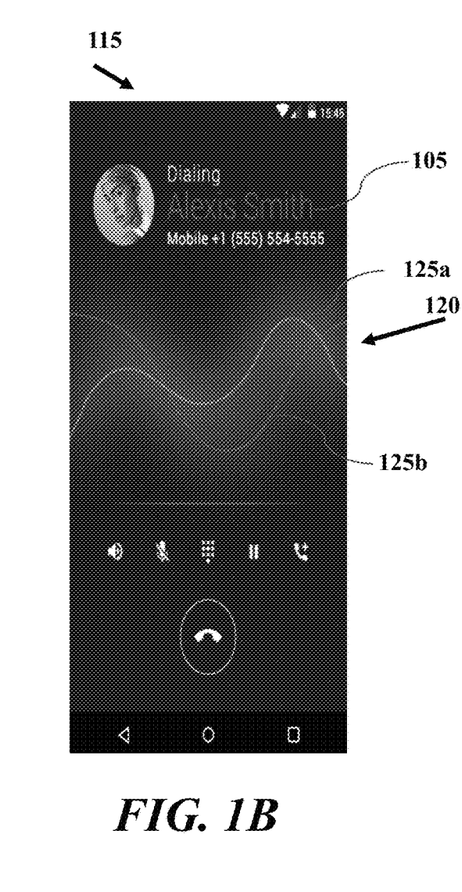
Figure 1C:
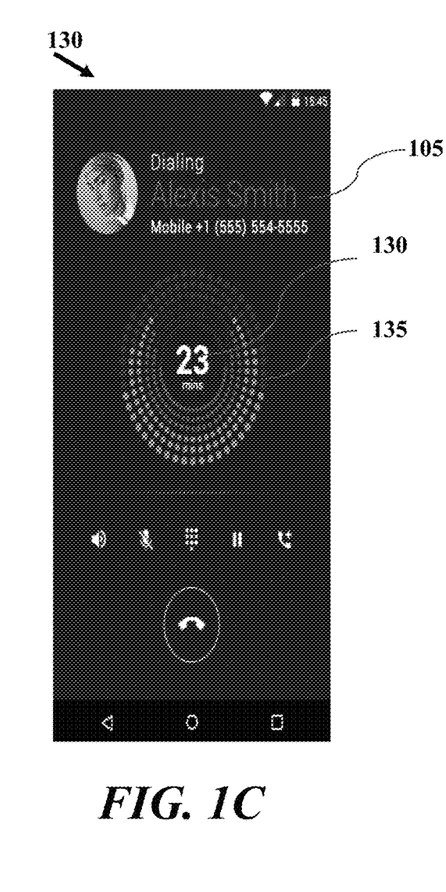

Referring now to the figures, FIGS. 1A-1C depict graphical representations of user interface presentation including dynamic information graphics according to one or more embodiments. According to one embodiment, a device is configured to display a user interface including a dynamic information graphic. Presentation of the dynamic information graphic and elements included in the display of the dynamic information graphic may depend on the operation mode of a device. As will be discussed herein, the dynamic information graphic can convey operation of the device visually. By way of example, presentation of a dynamic information graphic for a voice communication session can include display elements to identify one or more of the call stage (e.g., dialing, voice, hold, voicemail, termination, etc.). In certain embodiments, presentation of a dynamic information graphic may be based on data collected by a device during an operational mode. For voice communications, one or more of volume, words spoken, connections/disconnections to the device and other operations may be detected and employed to format and/or control presentation of the dynamic information graphic. In addition, a device and methods described herein may be configured to store the presentation of the dynamic information graphic to provide a representation/timeline of a communication session.

FIG. 1A depicts a graphical representation of device 100. Device 100 includes display 105, which is configured for presentation of a dynamic information graphic. FIG. 1A includes dynamic information graphic 110. Dynamic information graphic 110 relates to a multi-bar display. According to one embodiment, presentation format of dynamic information graphic 110 may include a plurality of bar elements for a first participant of a communication session, and a plurality of bar elements for another participant of the communication session. In that fashion, the one or more of the number of bar elements, color, and frequency of change may be based on communication data received and/or detected by device 100.

FIG. 1B depicts a graphical representation of device 100 and display 105, which is configured for presentation of dynamic information graphic 120. Dynamic information graphic 120 relates to a multi-wave pattern display. According to one embodiment, presentation format of dynamic information graphic 120 may include a plurality of waves (e.g., sinusoidal waves, etc.). In one embodiment, each sinusoidal wave 125a and 125b may relate to a voice detected during a communication session. FIG. 1C depicts a graphical representation of device 100 and display 105, which is configured for presentation of dynamic information graphic 130. Dynamic information graphic 130 relates to a circular/semi-circular pattern of graphical chip elements radiating in out from a portion (e.g., lower, upper, side, etc.) of the pattern.

It should be appreciated that dynamic information graphics 110, 120 and 130 are presented as animated or moving display elements. According to one embodiment, dynamic information graphics 110, 120 and 130 identify and/or provide visual information to compliment communication functions of the device 100. However, the visual representations of dynamic information graphics 110, 120 and 130 may be based on determinations and/or characterizations of device operation to provide useful information in addition to the visual appearance. Although dynamic information graphics 110, 120 and 130 are described in FIGS. 1A-1C as being associated with voice communication, it should be appreciated that dynamic information graphics may be provided for other functions and applications for a device.

Figure 2:
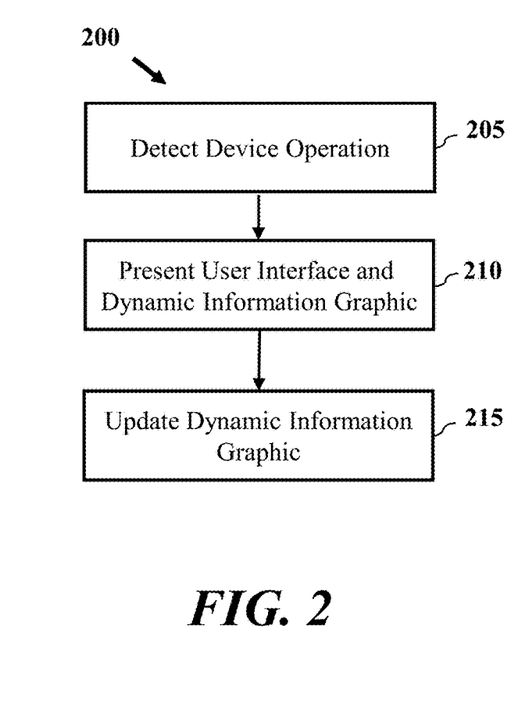
FIG. 2 depicts a process for presenting a user interface including a dynamic information graphic according to one or more embodiments.

FIG. 2 depicts a process presenting a user interface including a dynamic information graphic according to one or more embodiments. According to one embodiment, process 200 is executed by device (e.g., device 100, etc.). Process 200 includes detecting device operation at block 205. In block 205, for example, the device may detect an operational mode of the device for conducting a communication session by device. Operational modes may relate to the current display window (e.g., home screen, application view, function view, voice communication view, image collection view, etc.) and/or one or more functions being performed by the device. In on e embodiment, operational modes may be determined for one or more of dialing, on call status, hold, transfer and termination of voice communication operations of the device In contrast to displaying a background image (e.g., wallpaper, etc.) or merely including an icon, the dynamic information graphic may be based on information detected by the device during block 205. In that fashion, a device as described herein may be configured to detect and/or monitor one or more device parameters to ascertain current device operation.

At block 210, process 200 includes presenting, by the device, a user interface for the communication session including a dynamic information graphic, wherein the dynamic information graphic includes one more graphical elements based on the operational mode. The dynamic information graphic may be presented as a movable graphic, wherein one or more of size, color and motion are based on the one or more parameters At block 215, the device updates the dynamic information graphic. Updating presentation of the user interface and display of the dynamic information graphic at block 215 may be based on the one or more parameters. Presentation and configuration of the dynamic information graphic provides a visual representation based on device actions during the operational mode.

According to another embodiment, the dynamic information graphic may be presented as a scrollable element that may be navigated. In one embodiment, the dynamic information graphic may be scrolled through during a voice communication session. As such, the dynamic information graphic is presented as a scrollable timeline of the communication session. In one embodiment, the dynamic information graphic is generated and presented during a current session. According to anther embodiment, previously created dynamic information graphics may be viewed or presented on a device during a current function. In that fashion, previous or current communication sessions may be reviewed.

Updating the dynamic information graphic at block 215 may be based on one or more parameters detected by the device. For example, detecting one or more parameters can include detecting voice input of the voice communication and determining one or more terms from the voice communication. According to another embodiment, detecting one or more parameters includes detecting a stage of the communication session. At block 215, updating presentation of the user interface and display of the dynamic information graphic includes displaying the one or more terms by the device as part of the dynamic information graphic. According to another embodiment, updating the dynamic information graphic includes modifying the presentation of the dynamic information graphic based on the stage of the communication session Process 200 may also include generating a visual representation of the voice communication based on presentation of the dynamic information graphic and parameters detected. As will be discussed below in FIG. 5, a dynamic information graphic may be created as a timeline of a voice communication. Moreover, elements of the dynamic information graphic may include formatting and/or style elements that are applied to voice, audio and other parameters detected by the device. In that fashion, not only can users customize the format of the dynamic information graphic, the device can also apply desired formatting to a particular communication session. By way of example, two different conversations with the same dynamic information graphic format (e.g., wave patterns, etc.) can result in two different presentations on a display of the device. Moreover, saved timelines or scrollable dynamic information graphics can be useable following a communication session.

In addition to presenting visual elements of a dynamic information graphic, process 200 may also include matching voice detected in the voice communication to one or more predefined terms, and updating the dynamic information graphic to include presentation of matched terms as text on the display. Device 200 may include a database or memory of a plurality of terms to compare detected voice to. In one embodiment, terms presented with the dynamic information graphic may be based on a single term match/word matching, a theme detected for a communication session, and/or user preferences for presentation of terms.

Figure 3:
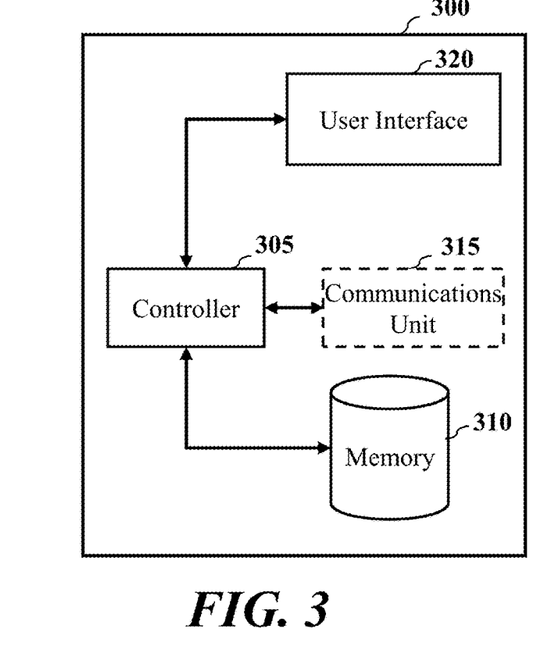
FIG. 3 depicts a simplified diagram of a device according to one or more embodiments.

FIG. 3 depicts a simplified diagram of a device according to one or more embodiments. Device 300 may relate to one or more of a media player, personal communication device, tablet, and electronic device having display. In certain embodiments, device 300 is a standalone device. In other embodiments, device 300 is a computing device (e.g., computer, media player, etc.) configured to interoperate with another device.

As shown in FIG. 3, device 300 includes controller 305, memory 310, optional communications unit 315 and user interface 320. Controller 305 may be configured to execute code stored in memory 310 for operation of device 300 including providing a dynamic information graphic. In an exemplary embodiment, controller 305 is configured to control display of a user interface including presentation of a dynamic information graphic.

According to one embodiment, controller 305 detects input relative to a display and/or audio sensor of user interface 320. Voice, text, and other parameters may be detected by controller 305 for presentation of a dynamic information graphic and updating of the dynamic information graphic.

According to one embodiment, controller 305 includes a processor and/or one or more processing elements. In one embodiment, controller 305 includes one or more of hardware, software, firmware and/or processing components in general. According to one embodiment, controller 305 is configured to perform one or more processes described herein. Optional communications unit 315 is configured for wired and/or wireless communication with one or more network elements, such as servers. Memory 310 can include non-transitory RAM and/or ROM memory for storing executable instructions, operating instructions and content for display. User interface 320 can include one or more input/output interfaces for control and/or communication. In certain embodiments, device 300 relates to a device including a display as part of user interface 320.

Figure 4:
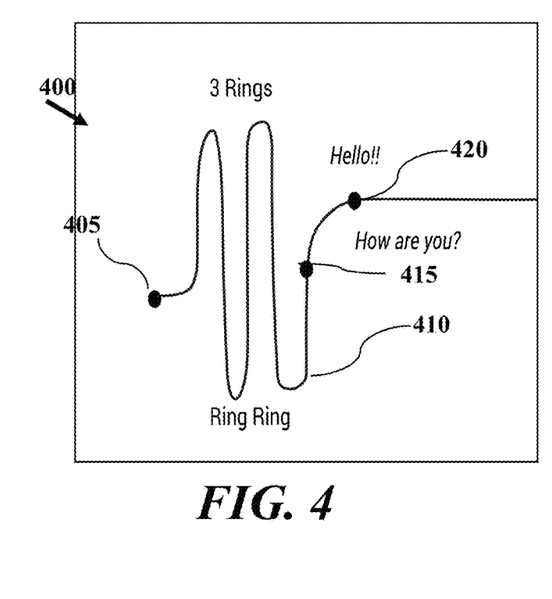
FIG. 4 depicts a graphical representation of a communication session according to one or more embodiments.

FIG. 4 depicts a graphical representation of a communication session according to one or more embodiments. According to one embodiment, a device (e.g., device 100, device 300) may be configured to detect and characterize device operation. FIG. 4 depicts an exemplary voice communication session 400. Communication session 400 includes start point 405, a series of rings 410, connection 415, and voice/greeting 420. According to one embodiment, a device is configured to detect voice during communication session, and one or more other parameters to generate a dynamic information graphic.

Figure 5:
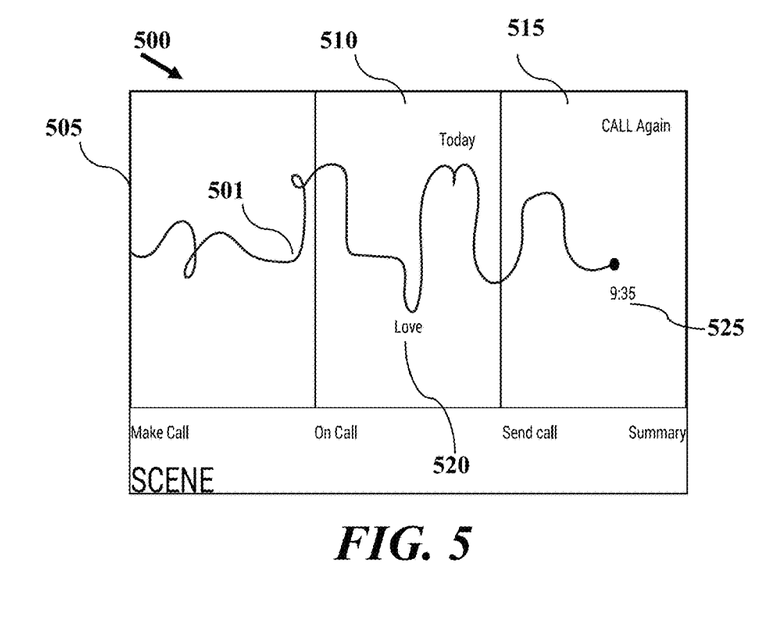
FIG. 5 depicts a graphical representation of a communication session according to one or more embodiments.

FIG. 5 depicts a graphical representation of a communication session according to one or more embodiments. According to one embodiment, based operation of a device, such as handling communication session 400, the device may be configured to generate a dynamic information graphic, and update the dynamic information graphic for presentation. Presentation of the dynamic information graphic over time, such as during a communication session, may relate to a scene. FIG. 5 depicts an exemplary scene for a voice communication session. Scene 500 may be a timeline of the presentation of a dynamic information graphic. Scene 500 includes start segment 505 relating to a period when a voice communication is initiated. Segment 510 relates to an on call period and segment 515 may relate to a send call period (e.g., call forwarding, etc.) According to one embodiment, scene 500 includes a segment 501 which is generated by a device and may be formatted by the device based on the voice communication. According to another embodiment, the device may include one or more graphical elements to describe scene 500. In an exemplary embodiment, scene 500 may include text 520 based on voice and/or themes detected during the communication session. According to another embodiment scene 500 may include call duration 525.

Figure 6A:
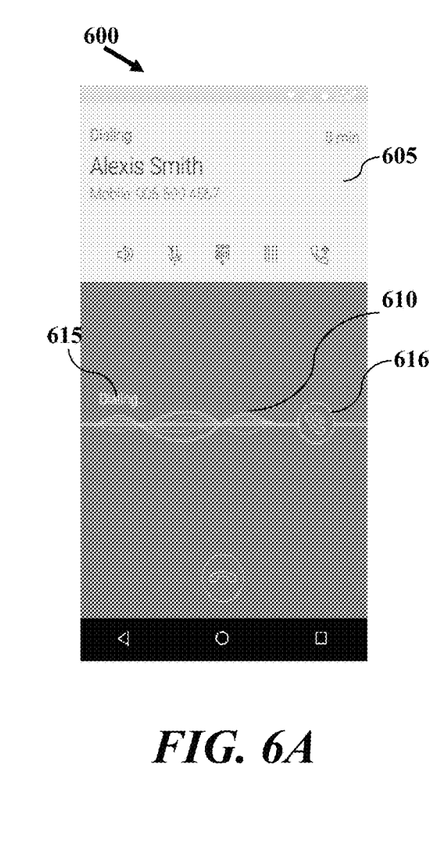
FIGS. 6A-6B depict graphical representations of dynamic information graphics according to one or more embodiments.
Figure 6B:
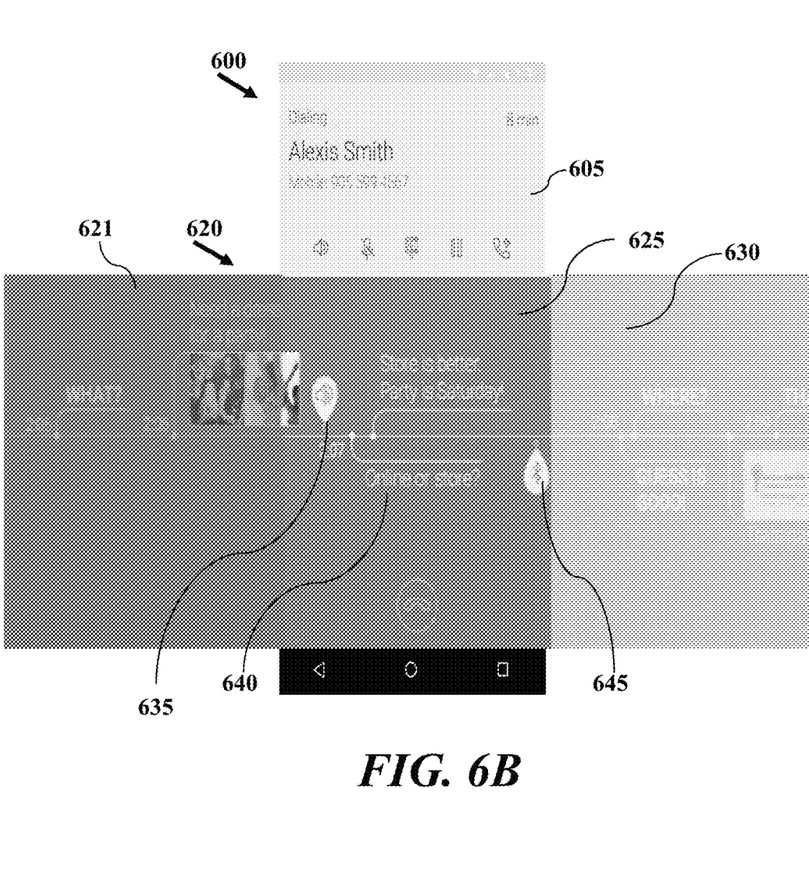

FIGS. 6A-6B depict graphical representations of dynamic information graphics according to one or more embodiments. According to one embodiment, a dynamic information graphic may be presented by a device during operation to provide visual information in addition to the user interface of the device. FIGS. 6A-6B depict an exemplary representation for voice communication. In FIG. 6A, device 600 is shown including display 605 and dynamic information graphic 610. According to one embodiment, a dynamic information graphic, such as dynamic information graphic 610, may be presented as a non-scrollable format to identify a current stage of device operation. Dynamic information graphic 610 is shown as including standing wave elements to signify a ringing operation. According to another embodiment, dynamic information graphic 610 may also include graphical 615 to indicate a ringing operation and graphical element 616 to indicate connection of the call once the call is connected. According to another embodiment, presentation of dynamic information graphic 610 may be updated to a different display format following call connection.

In FIG. 6B, device 600 is shown including display 605 and dynamic information graphic 620 following the updating of the dynamic information graphic 610 in FIG. 6A. According to one embodiment, dynamic information graphic 620 is shown as a call timeline that may be presented during a voice communication and allow for scrolling or reviewing the dynamic information graphic scene during the communication session.

Dynamic information graphic 620 is shown including past section 621, current display section 625 and forward section 630. Current display section 625 of dynamic information graphic 620 may relate to a selected section of the scene. In other embodiments, current display section 625 of dynamic information graphic 620 relates to a current time period of the communication session. FIG. 6B depicts visual representation of detected parameters such as element 635 indicating a volume change, element 640 indicating terms detected for the communication session, and element 645 indicating a availability of a device feature (e.g., wireless connection).

Figure 7A:
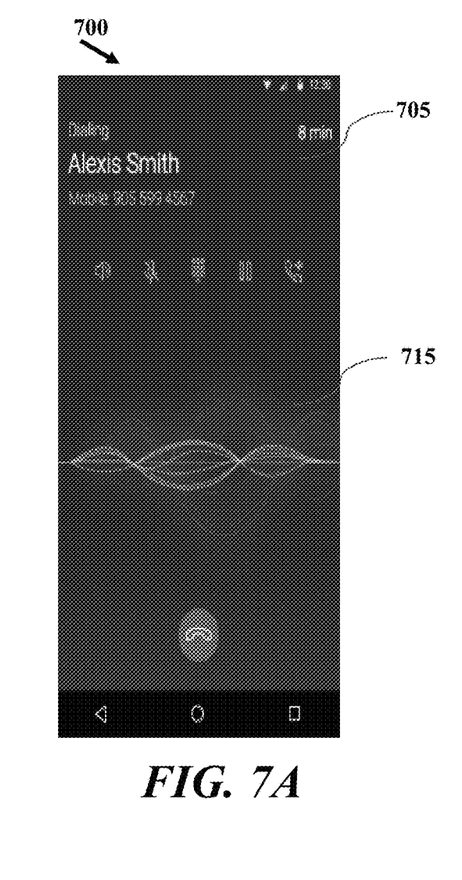
FIGS. 7A-7C depict graphical representations of dynamic information graphics according to one or more embodiments.
Figure 7B:
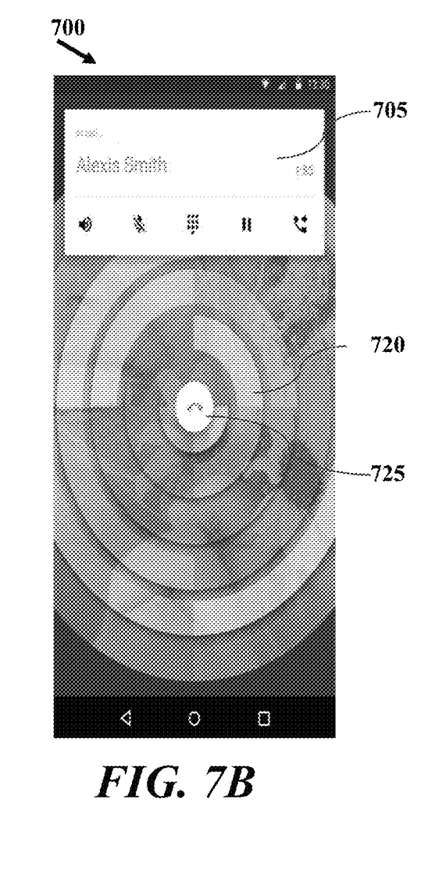
Figure 7C:
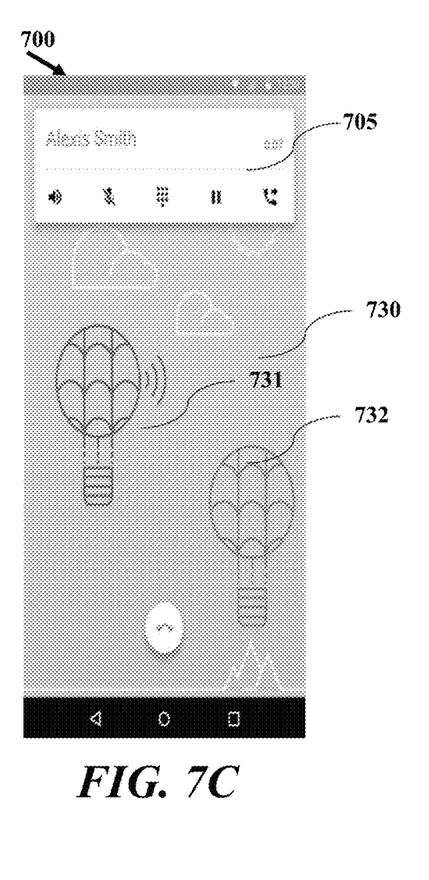

FIGS. 7A-7C depict graphical representations of dynamic information graphics according to one or more embodiments. Dynamic information graphics may be presented as graphical elements based on detection of device operation with visual elements. In FIG. 7A, device 700 is shown including display 705 and dynamic information graphic 710. According to one embodiment, dynamic information graphic 710 may be presented as a non-scrollable format wherein segments of dynamic information graphic 710 modulate and change position based on audio detected by the device.

In FIG. 7B, device 700 is shown including display 705 and dynamic information graphic 720. According to one embodiment, dynamic information graphic 720 may be presented as a non-scrollable format wherein circular and semicircular portions are rotated and/or positioned during a communication session. Dynamic information graphic 720 includes element 725 which may be selected to terminate a communication session and display of dynamic information graphic 720.

In FIG. 7C, device 700 is shown including display 705 and dynamic information graphic 730. According to one embodiment, dynamic information graphic 730 may be presented as a non-scrollable format wherein one or more elements 731 and 732 may be repositioned within the display area dynamic information graphic 730. In that fashion, device 700 may provide a graphic during a particular operation. In certain embodiments, an animation and/or movement of elements 731 and 732, may be associated with a particular function. For example, a hot air balloon graphic may be associated with dialing of a call. Updating presentation of dynamic information graphic 730 can include positioning elements 731 and 732 based on parameters detected by the device, such as detected voice, detected keywords, etc.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presenting a user interface including a dynamic information graphic, the method comprising:
   detecting, by a device, an operational mode of the device for conducting a communication session by device;
   presenting, by the device, a user interface for the communication session including a dynamic information graphic, wherein the dynamic information graphic includes one or more graphical elements based on the operational mode, wherein the dynamic information graphic indicates a ringing operation and connection of a call once the call is connected;
   detecting, by the device, one or more parameters for the communication session; and updating, by the device, presentation of the user interface and display of the dynamic information graphic based on the one or more parameters, wherein presentation and configuration of the dynamic information graphic provides a visual representation based on device actions during the operational mode, wherein the dynamic graphical element is presented as a scrollable timeline of the communication session, the dynamic graphical element including a segment generated by the device and formatted based on voice communication to include text based on voice detected during the communication session.

2. The method of claim 1, wherein the operational mode is associated with one of dialing, on call status, hold, transfer and termination of voice communication operations of the device.

3. The method of claim 1, wherein the dynamic information graphic is presented as a movable graphic, wherein one or more of size, color and motion are based on the one or more parameters.

4. The method of claim 1, wherein the dynamic information graphic includes standing wave elements to signify a ringing operation.

5. The method of claim 1, wherein detecting one or more parameters includes detecting voice input of the voice communication and determining one or more terms from the voice communication.

6. The method of claim 5, wherein updating presentation of the user interface and display of the dynamic information graphic includes displaying the one or more terms by the device as part of the dynamic information graphic.

7. The method of claim 1, wherein detecting one or more parameters includes detecting a stage of the communication session.

8. The method of claim 1, wherein updating the dynamic information graphic includes modifying the presentation of the dynamic information graphic based on the stage of the communication session.

9. The method of claim 1, further comprising generating a visual representation of the voice communication based on presentation of the dynamic information graphic and parameters detected.

10. The method of claim 1, further comprising matching voice detected in the voice communication to one or more predefined terms, and wherein updating includes presenting matched terms as text on the display, the dynamic graphical element including sinusoidal wave patterns that are labeled at one or more points with terms detected from the voice communication.

11. A device comprising:
a display; and
a controller coupled to the display, the controller configured to
detect an operational mode of the device for conducting a communication session by device;
present a user interface for the communication session including a dynamic information graphic, wherein the dynamic information graphic includes one or more graphical elements based on the operational mode, wherein the dynamic information graphical indicates a ringing operation and connection of a call once the call is connected;
detect one or more parameters for the communication session; and
update presentation of the user interface and display of the dynamic information graphic based on the one or more parameters, wherein presentation and configuration of the dynamic information graphic provides a visual representation based on device actions during the operational mode,
wherein the dynamic graphical element is presented as a scrollable timeline of the communication session,
the dynamic graphical element including a segment generated by the device and formatted based on voice communication to include text based on voice detected during the communication session.

12. The device of claim 11, wherein the operational mode is associated with one of dialing, on call status, hold, transfer and termination of voice communication operations of the device.

13. The device of claim 11, wherein the dynamic information graphic is presented as a movable graphic, wherein one or more of size, color and motion are based on the one or more parameters.

14. The device of claim 11, wherein the dynamic information graphic includes standing wave elements to signify a ringing operation.

15. The device of claim 11, wherein detecting one or more parameters includes detecting voice input of the voice communication and determining one or more terms from the voice communication.

16. The device of claim 15, wherein updating presentation of the user interface and display of the dynamic information graphic includes displaying the one or more terms by the device as part of the dynamic information graphic.

17. The device of claim 11, wherein detecting one or more parameters includes detecting a stage of the communication session.

18. The device of claim 11, wherein updating the dynamic information graphic includes modifying the presentation of the dynamic information graphic based on the stage of the communication session.

19. The device of claim 11, further comprising generating a visual representation of the voice communication based on presentation of the dynamic information graphic and parameters detected.

20. The device of claim 11, further comprising matching voice detected in the voice communication to one or more predefined terms, and wherein updating includes presenting matched terms as text on the display, the dynamic graphical element including sinusoidal wave patterns that are labeled at one or more points with terms detected from the voice communication.

* * * * *